United States Patent [19]
Reich et al.

[11] Patent Number: 5,162,301
[45] Date of Patent: Nov. 10, 1992

[54] SEPARATION OF PARAMAGNETIC AND DIAMAGNETIC GASES

[75] Inventors: Shymon Reich, Rehovot, Israel; Israel Cabasso, Syracuse, N.Y.

[73] Assignee: Yeda Research and Development Co., Ltd., Rehovot, Israel

[21] Appl. No.: 678,166

[22] Filed: Mar. 28, 1991

Related U.S. Application Data

[63] Continuation of Ser. No. 420,092, Oct. 10, 1989, abandoned.

[30] Foreign Application Priority Data

Oct. 7, 1988 [IL] Israel .................................. 087977

[51] Int. Cl.$^5$ ............................................. H01B 12/00
[52] U.S. Cl. ............................................ 505/1; 55/16; 55/68; 55/3; 55/158; 505/701; 505/700
[58] Field of Search ............... 55/1, 6, 3, 100, 158; 62/51.1; 505/1, 700, 701

[56] References Cited

U.S. PATENT DOCUMENTS 4,704,139  11/1987  Yamamoto et al. .................... 55/3

FOREIGN PATENT DOCUMENTS 3630913  3/1988  Fed. Rep. of Germany .

OTHER PUBLICATIONS

Orientation Dependent X-Ray Absorption Near Edge Structure in $YBa_2Cu_3O_7$ and $La_{1.85}Sr_{0.15}CuO_4$ Material Resource Soc. Symp Proc vol. 99 1988 Materials Research Society pp. 757–759.
The Condensed Chem. Dict. Tenth Edition Gressner G. Hawley published Van Nostrand Reinhold Co NYC, Oct. 25, 1981.
S. Reich et al., Nature, vol. 338, pp. 330,332, "Separation of Paramagnetic and Diamagnetic Molecules Using High-Tc Superconducting Ceramics", Mar. 23, 1989.
Patent Abstracts of Japan, vol. 13, No. 119 (C-579)[3467], Mar. 23, 1989; JP-A-63 291 621 Nov. 29, 1988.
Patent Abstracts of Japan, No. 142 (C-441), p. 142 C 441; JP-A-62 61 655 (Mar. 18, 1987).
"Separation of Paramagnetic and Diamagnetic Molecules Using High-T Superconducting Ceramics", reprinted from Nature, vol. 338, No. 6213, pp. 330-332, Mar. 23, 1989, authors Shimon Reich & Israel Cabasso, Macmillan Magazines Ltd., 1989.

Primary Examiner—Bernard Nozick
Attorney, Agent, or Firm—Browdy and Neimark

[57] ABSTRACT

The invention relates to a new method for the separation of gaseous paramagnetic species from diamagnetic or weakly paramagnetic gaseous species by contacting the mixture of such species with a high Tc superconductive material in permeable form, so that one of the species is enriched respective of the other one by permeation through such porous barrier.

6 Claims, 2 Drawing Sheets

SEPARATION OF PARAMAGNETIC AND DIAMAGNETIC GASES

This application is a continuation of application Ser. No. 07/420,092 filed Oct. 10, 1989 now abandoned.

FIELD OF THE INVENTION

The invention relates to a method for the separation or enrichment of diamagnetic from paramagnetic molecules and to a system for effecting such separations. The method is based on the discovery that the repulsive interaction between an elementary magnetic dipole (having a magnetic moment) and a micro-cavity in a suitable material in the superconductive state can effect separation of small molecules (S. Reich and I. Cabasso, Nature 338, 330 (19891)). Preferred superconductive materials are ceramic and composite superconductors.

The invention further relates to means for effecting such separations, comprising a semi-permeable barrier of such superconductive material through which the gaseous mixture of material is passed, resulting in the desired separation.

BACKGROUND OF THE INVENTION

It is well known in the art of using semi-permeable membranes to separate air, that said membranes in general will preferentially pass oxygen, and a detailed account of the use of semi-permeable membranes for the separation of gases is provided in an article by I. Cabasso, in the Encyclopedia of Polymer Science and Engineering, Vol. 9, pg. 564 by John Wiley & Sons, N.Y. 1987.

However, a need exists for semi-permeable membranes which will enable preferential passing of $N_2$, for purposes where $N_2$ enrichment is useful and where cryogenic processes for obtaining nitrogen enrichment are sought to be avoided.

SUMMARY OF THE INVENTION

The invention entails a method for the separation of gaseous strongly paramagnetic molecules, ions or radicals from diamagnetic or weakly paramagnetic molecules, ions or radicals and comprises a mixture of said gases with a high Tc superconductive permeable material in a manner such that an enrichment of one of said molecules, ions or radicals occurs by permeation a body of through said permeate material. The enrichment of nitrogen is a particularly preferred embodiment of the invention.

The enery of interaction (E) of a magnetic dipole(m) and a superconducting wall is easily calculated by the mirror principle (Reich, S., Amer. J. Physics. July 1988). see FIG. 1. This interaction is given by:

$$E = \frac{\bar{m}_1 \bar{m}_2}{r^3} - \frac{3(\bar{m}_1 \bar{r})(\bar{m}_2 \bar{r})}{r^5} = \frac{m^2}{r^3} \{\cos \epsilon - 3\cos \theta_1 \cos \theta_2\} \quad (1)$$

where $m_2$ is the mirror image of $m_1$, and $O_2 + O_2 = 180°$. The thermal tumbling of m when average over all orientations O gives $$<E> = \frac{3}{2} \frac{m^2}{r^3} \quad (2)$$

If the tumbling magnetic dipole is enclosed in the center of a cubic cavity, and the question is asked at what distance of confinement is the repulsive interaction of the superconducting walls equal to the thermal kinetic energy of the elementary magnetic moment, the following equations would apply:

$$6<E> = \frac{3}{2} kT \quad (3)$$

thus $$r = \left( \frac{6m^2}{kT} \right)^{\frac{1}{3}} \quad (4)$$

If $m_2$ is substituted by the paramagnetic susceptibility $\chi(T)$ then $$\chi(T) = \frac{m^2 N}{3kT} \quad (5)$$

where N is the Avogadro number, $$r \simeq \left( \frac{18 \chi(T)}{N} \right)^{\frac{1}{3}} \quad (6)$$

From equation 6 it is possible to estimate the effective distance r at which the repulsive interaction between the molecular magnetic moment and the superconducting diamagnetic enclosure will strongly affect the thermal diffusivity of this magnetic dipole. Compare for example the relevant size parameters for oxygen-a paramagnetic molecule-versus that of diamagnetic nitrogen. The effective molecular diameter of oxygen as derived from Einstein Stokes (E. S.) equation using the diffusion constant of $O_2$ in ethanol (CRC Handbook of Chemistry and Physics, 64th Ed., 1984, pp. F-45) is 1.67 Angstrom. The same calculation for $N_2$ in carbon tetrachloride yields 1.24 Angstrom (CRC Handbook of Chemistry and Physics, 64th Ed., 1985, pp. F-45), in comparison 2r for oxygen (using $\chi(91° K.) = 1.08 \times 10^{-2}$ ml/mole (Stoner, E. C. Magnetism and Atomic Structure (Methuen & Co. Ltd., London, 1926) pp. 142; Curie's corrected result $\chi = 32 \times 0.0307/T$))), is 1.37 Angstrom. Nitrogen on the other hand is diamagnetic $\chi(300° K.) = -12 \times 10^{-6}$ ml/mole.

It is seen that 2r is comparable with the effective diameter as calculated from E. S. eq. Pauling dimensions for $O_2$ are 2.8 Angstrom width and 3.9 Angstrom length and its kinetic diameter $\sigma = 3.46$ Angstrom. Corresponding values for Nitrogen are: 3.0 Angstrom, 4.1 Angstrom and 3.64 Angstrom (Breck, D. W. Zeolite Molecular Sieves, 636, 650 (Wilen, N.Y., 1974)). What seems to be a minor difference in the kinetic diameters of these two molecules is considered to be one of the important reasons why zeolites and glassy polymers show preferential sorption and permeation of oxygen over nitrogen. It follows that the repulsive interaction will increase the effective kinetic diameter of oxygen. Thus, for example, if air is diffused through a superconducting ceramic material at T<Tc a preferential permeability of nitrogen surprisingly exists. However, in the case of other known semi-permeable material, oxygen passes preferentially. When the average pore diameter is low enough $\sim <10$ Angstrom the nitrogen enriched permeate should contain only a minute fractions of oxygen if at all. It is possible to effect the separation process with molecular gaseous species, with ions, radicals, etc., having a high paramagnetic contrast: one of the species being paramagnetic while the other is diamagnetic or at least weakly paramagnetic.

DESCRIPTION OF THE PREFERRED EMBODIMENT

Figure 1:
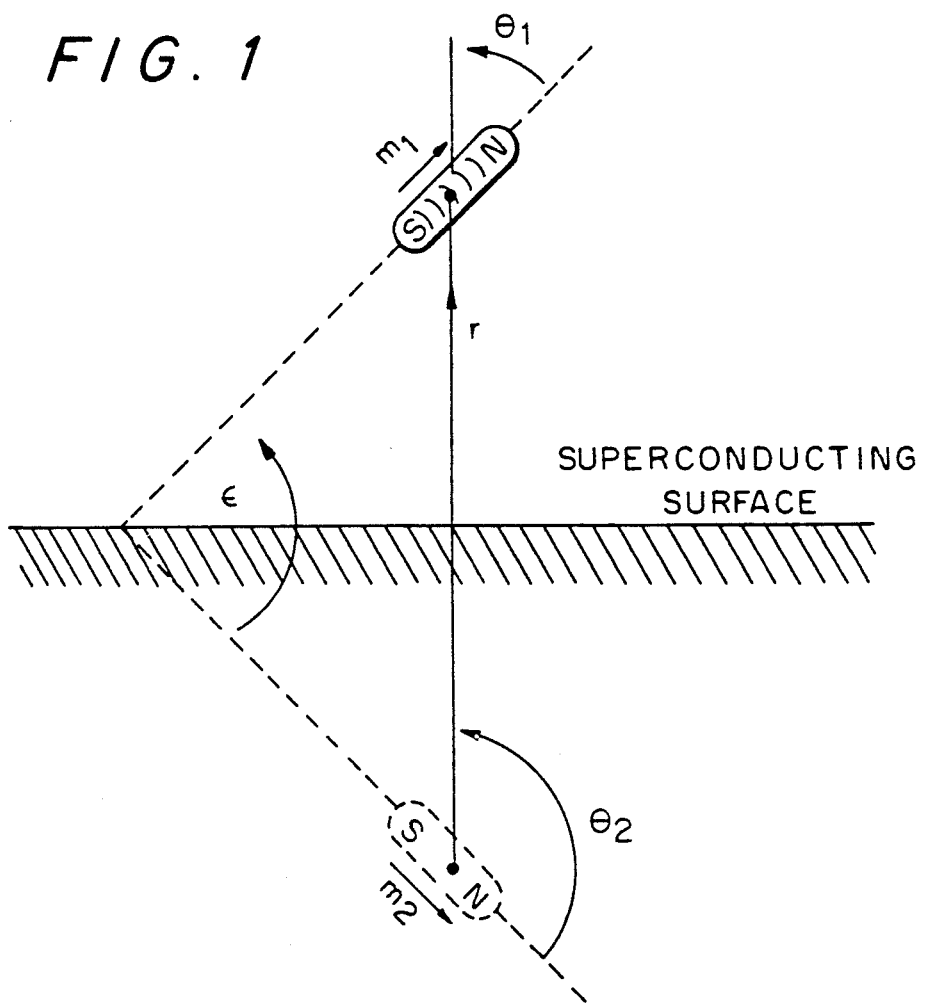
FIG. 1 illustrates the magnetic moment $m_1$ and its mirror image $m_2$ in the superconducting wall.

The invention is illustrated by way of examples with reference to the following description.

As an example, the possibility of preferential permeability of nitrogen over that of oxygen through $YBa_2Cu_3O_7-\delta$ in the diamagnetic state is examined. Such separation process takes place for a diffusion controlled permeation of air through a superconducting pellet in the temperature range in which the diamagnetic susceptibiltiy is fully developed. (The Meissner onset temperature in the samples was 102° K. and the diamagnetic effect was fully developed at ~77° K.). The permeation experiment was therefore performed using a low pressure gradient of 50 KPa starting at the lowest temperature possible, i.e., just above the due point of air; 81.3° K. at 100 KPa. Below the dew line the results of the permeation experiments are obscured by the gas-liquid equilibria of oxygen and nitrogen.

EXAMPLE 1

In an experiment conducted (see FIG. 2), dry air 1 was passed over and diffused through a $YBa_2Cu_3O_{7-\delta}$ pellet 2, 13 mm in diameter and 1 mm thick, mounted on a brass block 3 which was cooled by liquid nitrogen 4. The composition of the outflow gas 5 (~0.4 ml/min at 26° C.) was analyzed by a gas chromatograph (not shown) in real time. The brass block contains a carbon resistor thermometer 6, and a silicon rubber seal 7 disposed beneath a cover containing O-rings 8 and having air leak means 9. The results, in the temperature range between 82° K. and 92° K., are shown in FIG. 3a. The critical transition temperature (Tc) for this pellet was 92°±0.5° K., its resistance versus temperature behavior is shown in FIG. 4a. This sample was quite porous, its specific density was $(\rho) = 5.64$ g.cm$-3$ which should be compared with the specific theoretical density $(\rho th = 6.4$ g.cm$-3$.

In a control experiment a $YBa_2Cu_3O_6$ rich pellet was prepared by a fast quench of a $YBa_2Cu_3O_{7-\delta}$ pellet from 900° C. to liquid nitrogen temperature. This sample did not exhibit the Meissner effect and a plot of its resistance versus temperature is shown in FIG. 4b. This pellet was similar in density and micro grain structure to the superconducting sample used in experiment 4a. It is apparent from comparison of the plots in FIGS. 3a and 3b, that the superconducting sample does impede the mobility of $O_2$ for T$\leq$83° K., and indeed shows preferential permeability for nitrogen, >90% $N_2$, in comparison to that of the control less than 80% $N_2$. This trend is followed by a sharp desorption of the trapped oxygen, up to 55% $O_2$, for T~85° K., the permeate stream composition subsequently tails off to the ratio 0.268 of $O_2/N_2$ observed in the air composition used in this experiment.

The experimental results demonstrate the preferential permeability of nitrogen over that of oxygen in a temperature range which the diamagnetism of the ceramic material is strong, followed by desorption of oxygen upon the increase of the magnetic susceptibility in the pellet.

EXAMPLE 2

The same condition and superconducting membrane as described in Example 1 for $YBa_2Cu_3O_{7-\delta}$ but switching the temperature on and off periodically between 82.5° K. to 85° K. yields pulsating device which produces $O_2$ or $N_2$ enriched air.

The separation process is applicable to any gaseous mixture of molecules which differ substantially in their magnetic properties: the separation being effected between paramagnetic and diamagnetic molecules. Examples of these mixtures are oxygen/nitrogen: NO from nitrogen, etc. A wide variety of superconductive materials can be used, there may be mentioned superconductive ceramics of the perovisktie-like structure of the high Tc superconductive type. There may be specifically mentioned of the CuOn type, where n is a number such as

| | | |
|---|---|---|
| $Tl_2Ba_2CuO_6$ | | Tc = 80° K. |
| $Bi_2Cu_1Sr_2Cu_2O_{5+x}$ | or $\delta$ | Tc = 85° K. |
| $YBa_2Cu_3O_{7-x}$ | or $\delta$ | Tc = 92° K. |
| $Tl_2Ca_1Ba_2Cu_2O_8$ | | Tc = 105° K. |
| $Tl_2Ca_2Ba_2Cu_3O_{10}$ | | Tc = 125° K. |

Thus, according to a preferred embodiment the separation system is based on a high Tc superconductor, in the superconductive, i.e., diamagnetic state. The material has to be at a temperature below Tc.

The body of superconductor material ought to be in a form permeable to the gaseous species. Possible separation means are sintered ceramic platelets, sintered ceramic films on a ceramic support, sintered ceramic hollow fibers, a ceramic powder in the micrometer ($\mu$m) and sub-micron size ranges of the high Tc superconductor in bulk or embedded in a polymeric matrix or membrane; in which latter case the membrane may enhance the separative effect.

Examples of such materials are: Poly(aminosiloxanes)

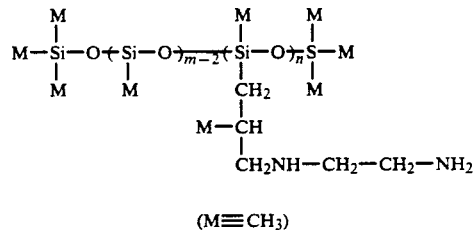

(M≡CH$_3$)

silicone rubber, natural rubber, SBR, butyl rubber polychloroprene, polyethylene (density 0.914 g/cm$^2$; and 0.964 g/cm$^3$) poly (dimethylphenylene oxide), polysulfone, polycarbonate, cellulose acetate. Separate species ≡molecules, ions, radicals, having a high paramagnetic contrast, e.g., one highly paramagnetic species.

EXAMPLE 3

In another experiment the relative permeation of $O_2$ against $N_2$ was measured through a relatively thick 9-mm $YBa_2Cu_3O_7-\delta$ pellet and through a $YBa_2Cu_3O_6$-rich sample of the same geometry using a pressure gradient of 80 kPa and a flow rate of $\sim -0.2$ ml min$^{-1}$. The results, in the temperature range 85°–88° K. measured at a heating rate of 0.1° K. min$^{-1}$, are presented in Table 1. Continuous flow of permeate with a composition of 96% $N_2$ was easily attained. In this set of experiments high selectivity is observed, with $(O_2/N_2)$air/$(O_2/N_2)$permeate$\approx 5$ at 86.4° K..

EXAMPLE 4

Application of an external magnetic field, H>Hc, to the diamagnetic membrane in the superconducting state was found to quench the preferential selectivity of the superconductor for nitrogen (against oxygen) that is observed for T<Tc and H=0. Thus, the superconductor with the composition $Bi_{1.8}Pb_{0.2}Ca_2Sr_2Cu_3O$, a ceramic with a high Tc(111°±1° K.) and low Hc$_1$(<100 Oe at 4.2 K.), was prepared to test this prediction. The permeation experiment was conducted through a 2-mm-thick pellet using a pressure gradient of 50 kPa, a flow rate of 0.4 ml min$^{-1}$ and a heating rate of 0.1 K. min$^{-1}$. For air feed flow at a composition of 74% $N_2$ at 96° K. the superconducting pellet produced $N_2$-enriched permeate of 90% nitrogen. FIG. 3c, d shows the results for a magnetic filed (H=0 and H=220 Oe) applied perpendicularly to the surface of the pellet. The measured selectivity is shifted to a higher temperature range than that observed for $YBa_2Cu_3O_{7-8}$ (see FIG. 3a, b) as is the desorption peak, which is at $\approx 102$ K. for the zero-field run. A field of 220 Oe is large enough to quench the selectivity effect as the magnetic flux penetrates the diamagentic membranes. Yielding a pulse of oxygen-enriched permeate (44% $O_2$). Switching on and off the external magnetic field yields pulsating membrane giving oxygen and/or nitrogen enriched air. (Note that at $\approx 100°$ K., Hc$_1$<20 Oe).

FIGURE CAPTIONS

FIG. 1: The magnetic moment $m_1$ and its mirror image $m_2$ in the superconducting wall.

Figure 2:
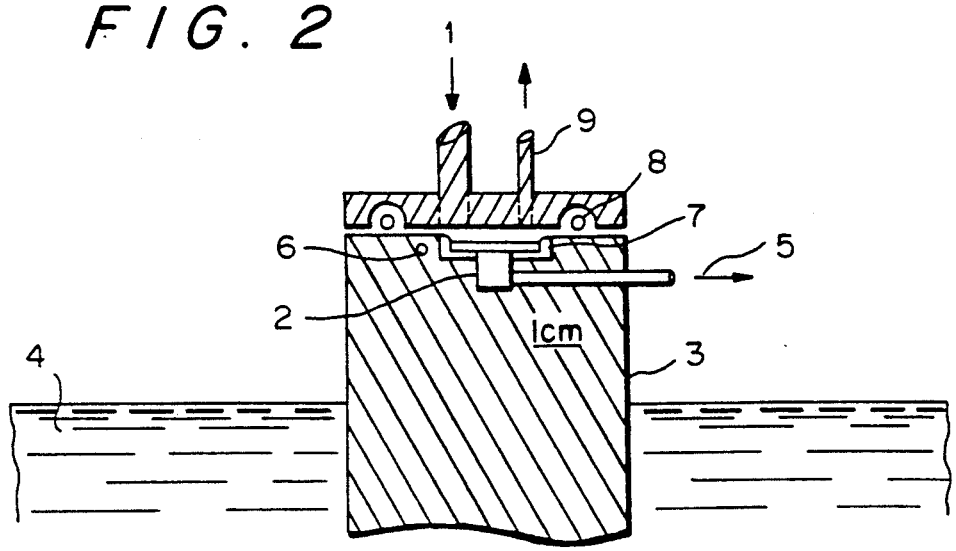
FIG. 2 illustrates schematically an experimental setup of the measurement of the permeabilities of $O_2$ and $N_2$ through high Tc ceramic pellets at a suitably low temperature.

FIG. 2: Experimental set-up for measurement of $O_2$ and $N_2$ permeabilities through ceramic pellets at low temperatures.

Figure 3:
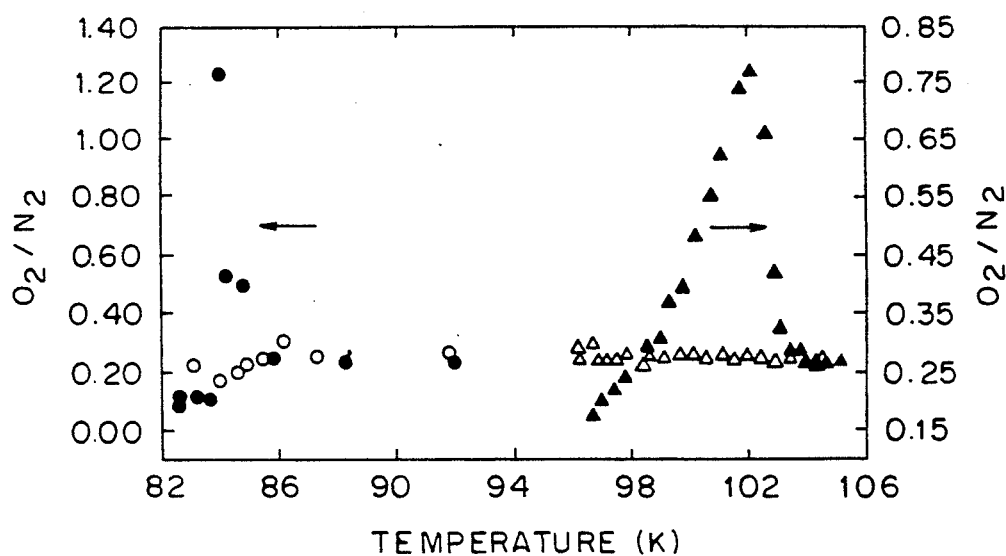
FIG. 3 illustrates the ratio of oxygen/nitrogen in the outflowing gas with two types of ceramic superconductors.

FIG. 3: Oxygen to nitrogen ratio in the outflow gas as a function of temperature for $YBa_2Cu_3O_{7-8}$ (●), a $YBa_2Cu_3O_6$ rich pellet (○), and $Bi_{1.8}Pb_{0.2}Ca_2Sr_2Cu_3O_x$ in a field H=O (▼) and H=220 Oe (△).

Figure 4:
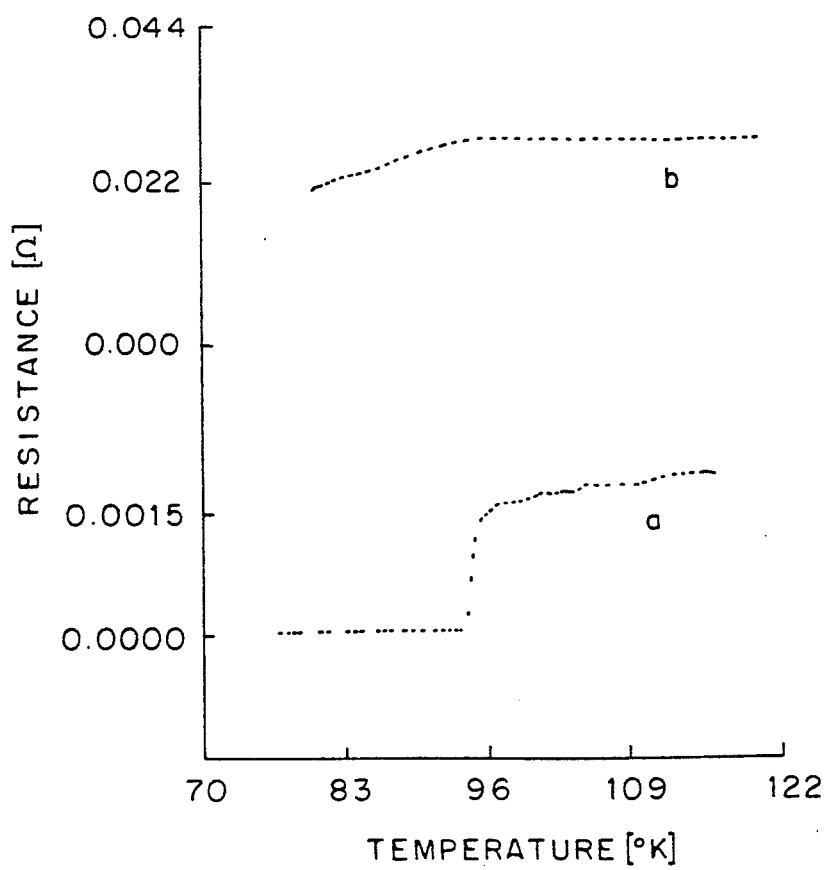
FIG. 4 illustrates resistance/temperature for: a) $YBa_2Cu_3O_{7-\delta}$ pellet; b) for $YBa_2Cu_3O_6$ rich pellet.

FIG. 4: Resistance versus temperature: a) for $YBa_2Cu_3O_{7-8}$ pellet; b) for $YBa_2Cu_3O_6$ rich pellet.

TABLE 1

$O_2/N_2$ ratio in out-flow gas through $YBa_2Cu_3O_{7-\delta}$ and a $YBa_2Cu_3O_5$-rich pellet as a function of temperature

| $YBa_2Cu_3O_{7-\delta}$ pellet | | $YBa_2Cu_3O_6$-rich pellet | |
|---|---|---|---|
| $O_2/N_2$ | T (K.) | $O_2/N_2$ | T (K.) |
| 0.04 | 85.3 | 0.26 | 84.8 |
| 0.05 | 85.6 | 0.27 | 85.0 |
| 0.05 | 86.2 | 0.26 | 85.2 |
| 0.05 | 86.4 | 0.27 | 85.6 |
| 0.08 | 86.6 | 0.27 | 86.2 |
| 0.10 | 87.6 | 0.27 | 87.5 |

In general, the invention apparatus and processes can be used whenever separation or enrichment of mixtures of gases having paramagnetic and diamagnetic species are present; however, the use of the invention process is especially applicable when there is a need for enriched nitrogen to provide an inert environment in the food industry or to prevent chemical reactions or explosions, such as those which might occur on tankers carrying oil, and since the membrane rejected gas in an ordinary air mixture using the invention process is oxygen, the invention has utility in any area where enriched oxygen is needed.

We claim:

1. A method for separation of a component from a gaseous mixture of paramagnetic molecules and diamagnetic molecules comprising:
    contacting said mixture with a high Tc superconductive permeable body of a material in the diamagnetic state, below the transition temperature to the superconductive state, such that the diamagnetic molecules preferentially permeate the body of the high Tc superconductive permeable material while permeation of paramagnetic molecules through said body is retarded.

2. The method of claim 1, wherein said gaseous material separated is an oxygen/nitrogen mixture.

3. The method of claim 1, wherein the gaseous mixture is air, said high Tc superconductive permeable body is a porous ceramic in the form of pellets, hollow fibers, or a ceramic film supported by a permeable support, and wherein said air mixture is contacted with said high Tc superconductive body at the lowest temperature just above the dew point of air.

4. The method of claim 3, wherein said high Tc superconductive permeable (body) is a porous ceramic selected from copper oxide containing compounds selected from:

| | |
|---|---|
| $Tl_2Ba_2CuO_6$ | Tc = 80° K. |
| $Bi_2Cu_1Sr_2Cu_2O_{8+x}$ | Tc = 85° K. |
| $Bi_2Cu_1Sr_2Cu_2O_{8+\delta}$ | |
| $YBa_2Cu_3O_{7-x}$ | Tc = 92° K. |
| $YBa_2Cu_3O_{7-\delta}$ | |
| $Tl_2Ca_1Ba_2Cu_2O_8$ | Tc = 105° K. |
| $Tl_2Ca_2Ba_2Cu_3O_{10}$ | Tc = 125° K. |
| and | |
| $Bl_{1.8}Pb_{0.2}Ca_2Sr_2Cu_3O_x$ | Tc = 111° K. |

5. A method for separation of a mixture including nitrogen and (comprising) paramagnetic and diamagnetic molecules, comprising:
    contacting said mixture with a high Tc superconductive permeable body of $YBa_2Cu_3O_{7-x}$ or $Yba_2Cu_3O_7-\delta$ in the diamagnetic state at the lowest temperature just above the dew point of air at 81.3° K. such that an enrichment of diamagnetic nitrogen molecules occurs by permeation through said permeable body.

6. A method of separation of a component from a gaseous mixture of paramagnetic molecules and diamagnetic molecules, comprising:
    flowing said gaseous mixture against a permeable body formed of a high Tc superconductive material in the diamagnetic state, below the transition temperature Tc to the superconductive state, such that the diamagnetic molecules preferentially permeate and pass through the high Tc superconductive permeable body while the paramagnetic molecules are preferentially restrained thereby, said permeable body in the diamagnetic state acting as a barrier to the paramagnetic molecules.

* * * * *